United States Patent [19]

Pitel

[11] Patent Number: 4,641,232

[45] Date of Patent: Feb. 3, 1987

[54] ELECTRICAL POWER INVERTER HAVING A PHASE MODULATED, TWIN-INVERTER, HIGH FREQUENCY LINK AND AN ENERGY STORAGE MODULE

[75] Inventor: Ira J. Pitel, Whippany, N.J.

[73] Assignee: Allied Corporation, Morris Township, Morris County, N.J.

[21] Appl. No.: 693,955

[22] Filed: Jan. 23, 1985

[51] Int. Cl.$^4$ .............................................. H02P 13/20
[52] U.S. Cl. ........................................ 363/71; 363/89; 363/132; 363/98
[58] Field of Search ................... 363/8, 16, 17, 89, 97, 363/98, 71, 131, 132, 157, 159; 323/205, 207, 266

[56] References Cited

U.S. PATENT DOCUMENTS 4,556,937 12/1985 Ziogas et al. ................... 363/132

FOREIGN PATENT DOCUMENTS

| 42819 | 4/1981 | Japan | 323/205 |
| 723751 | 3/1980 | U.S.S.R. | 363/157 |
| 1128332 | 12/1984 | U.S.S.R. | 323/205 |

OTHER PUBLICATIONS

Klaasens, "A 95-Percent Efficient 1-KW DC Converter with an Internal Frequency of 50 kHz", IEEE Transactions on Industrial Electronics and Control Instrumentation, vol. IECI-25, No. 4, 11/78, pp. 326-333.
Ranganathan, et al., "A DC-AC Power Conversion Technique Using Twin Resonant High Frequency Links", IEEE, pp. 786-792.
Steigerwald, et al., "Application of Power Transistors to Residential and Intermediate Rating Photovoltaic Array Power Conditioners", IEEE, vol. IA-19, No. 2, pp. 254-267.
Cocconi, et al., "High-Frequency Isolated 4 KW Photovoltaic Inverter for Utility Interface", PCI/Motor-Con Proceedings, 9/83, pp. 39-59.
Steigerwald, et al., "A Comparison of High-Frequency Link Schemes for Interfacing a DC Source to a Utility Grid", IEEE, 1982, 759-766.

*Primary Examiner*—Peter S. Wong
*Assistant Examiner*—Judson H. Jones
*Attorney, Agent, or Firm*—Anibal J. Cortina

[57] ABSTRACT

The present invention provides an electrical power inverter method and apparatus, which includes a high frequency link, for converting DC power into AC power. Generally stated, the apparatus includes a first high frequency module which produces an AC voltage at a first output frequency, and a second high frequency inverter module which produces an AC voltage at a second output frequency that is substantially the same as the first output frequency. The second AC voltage is out of phase with the first AC voltage by a selected angular phase displacement. A mixer mixes the first and second output voltages to produce a high frequency carrier which has a selected base frequency impressed on the sidebands thereof. A rectifier rectifies the carrier, and a filter filters the rectified carrier. An output inverter inverts the filtered carrier to produce an AC line voltage at the selected base frequency. A phase modulator adjusts the relative angular phase displacement between the outputs of the first and second high frequency modules to control the base frequency and magnitude of the AC line voltage.

13 Claims, 19 Drawing Figures

WAVEFORMS OF CYCLIC
ENERGY TRANSFER

FREQUENCY SPECTRUM OF $V_4$

CURRENT OF TRANSISTOR Q23 UNDER
MAXIMUM LOADING

INPUT CURRENT OF OUTPUT RECTIFIER
UNDER MAXIMUM LOADING

INVERTER OUTPUT CURRENT AT (a) MAXIMUM
AND (b) HALF POWER SETTING
(UTILITY LOAD AT 240 VOLTS)

INVERTER OUTPUT CURRENT AT (a) MAXIMUM AND (b) HALF POWER SETTINGS (3.3 Kw LOAD)

ELECTRICAL POWER INVERTER HAVING A PHASE MODULATED, TWIN-INVERTER, HIGH FREQUENCY LINK AND AN ENERGY STORAGE MODULE

Work on this invention was performed under U.S. Department of Energy Contract No. DE-AC01-83ER80007 dated Sept. 1, 1983; Business Innovation Research; Magna-Power Electronics.

DESCRIPTION

Field of the Invention

The present invention relates to an inverter device for converting dc power to ac power. More particularly, the invention relates to an electrical power inverter device which employs a phase modulated, high frequency link.

BACKGROUND OF THE INVENTION

Conventional electrical power inverter devices and techniques include ferroresonant and pulse-width modulation (PWM) technologies. These two technologies are low-frequency based and require bulky electromagnetic devices sized for operation at 60 Hz.

High-frequency links have rapidly become the preferred technology in grid-connected, photovoltaic inverter applications, and are discussed in the following publications:

R. L. Steigerwald, A. Ferraro, F. G. Turnbull, "Application of Power Transistors to Residential and Intermediate Rating Photovoltaic Array Power Conditioners," to be published in the *IEEE Transaction on Industry Applications*.

R. L. Steigerwald and R. E. Tompkins, "A Comparison of High-Frequency Link Schemes for Interfacing a DC Source to a Utility Grid," presented at the IEEE Industry Applications Society Annual Meeting, October 1982.

A. Cocconi, S. Cuk and R. D. Middlebrook, "High-Frequency Isolated 4 KW Photovoltaic Inverter for Utility Interface," PCI/Motor-Con Proceedings, September 1983, pp. 39–59.

W. I. Bower, T. S. Key, B. J. Petterson, "Photovoltaic Power-Conditioning Performance Evaluation, Lessons Learned," presented at the 17th IEEE Photovoltaic Specialist Conference, May 1984.

T. S. Key, "Power Conditioning for Grid-Connected P. V. Systems Less than 250 KW," to be presented at the 19th Intersociety Energy Conversion Engineering Conference, August 1984.

V. T. Ranganathan, P. D. Ziogas, V. R. Stefanovic, "A DC-AC Conversion Technique Using Twin Resonant High Frequency Links," presented at the IEEE Industry Applications Society Annual Meeting, October 1982.

High-frequency links have the advantage of providing dc isolation and inversion without the need of 60 Hz magnetics. As a result, designs can be smaller and lighter, and exhibit a downwards cost trend based on advances in the semiconductor art.

High-frequency link inverters operate on the principle of converting dc to ac by means of a high-frequency power carrier (typically 20 kHz or above) containing a complex pattern of sidebands. This signal, when rectified and inverted, produces an ac output having a low-frequency base. The process requires several power conversion stages, none of which requires 60 Hz magnetics.

Three conversion stages are normally associated with high-frequency links: high-frequency inversion, rectification and low-frequency inversion. For the first two stages, complex snubber networks are usually applied. These networks limit semiconductor stress by shaping load lines within acceptable limits. Newly evolved snubbers can also perform this function with very low power loss by first storing transition energy in reactive components, and then releasing it to the sources. Snubber networks known to the art are disclosed by:

R. Goldfarb, "A New Non-Dissipative Load-Line Shaping Technique Eliminates Switching Stress in Bridge Converters," Proceedings of Powercon 8, 1981; and by W. J. Shaughnessy, "Modelling and Design of Non-Dissipative LC Snubber Networks," Proceedings of Powercon 7, 1980.

Resonant power conversion techniques have been recognized as an extremely efficient means of converting power, and have characteristically reduced stress on power semiconductors by switching at substantially zero current or voltages.

For example, such techniques have been discussed by I. J. Pitel, U.S. Pat. No. 4,075,476; by F. C. Schwartz and J. B. Klaasens, "A 95-Percent Efficient 1-KW DC Converter with an Internal Frequency of 50 kHz", *IEEE Transactions on Industrial Electronics and Control Instrumentation*, Vol. IECI - 25, NO. 4, November 1978, pp. 326–333; and by R. L. Steigerwald, "High-Frequency Resonant Transistor DC-DC Converters" *IEEE Transactions on Industrial Electronics* Vol. 1E-31, No. 2, May 1984.

Two major limitations and reasons why resonant power conversion techniques have not gained increased usage are that they are not easily controlled and work well only at full power output.

With conventional 60 Hz, low frequency inverters, the power conversion circuitry is arranged to circulate periodic reactive power between the source and load to maintain a zero average real power output. This is usually done with non-controlled switches, feedback diodes, or sometimes with 60 Hz reactive components as a storage medium. In general, these inverters are characterized as being unidirectional because real power can only flow from the source to the load.

Conventional high frequency links have complicated the flow of 60 Hz reactive power. Periodic circulation of reactive power to the high frequency link occurs over many cycles, and simple feedback diodes have not been viable. A possible technique would be to double the number of switches in an opposing manner to allow bi-directional power flow. Although this method could probably work, it would increase the cost and reduce the practicality of the device.

SUMMARY OF THE INVENTION

The present invention provides an electrical power inverter method and apparatus, which includes a high frequency link, for converting DC power into AC power. Generally stated, the apparatus includes a first high frequency module which produces a first AC voltage at a first output frequency, and a second high frequency inverter module which produces a second dc voltage at a second output frequency that is substantially the same as the first output frequency. The second AC voltage is out of phase with the first AC voltage by a selected angular phase displacement. Mixing means mix the first and second AC output voltages to produce a high frequency carrier which has a selected base frequency impressed on the sidebands thereof. Rectifying means rectify the carrier, and filtering means filter the rectified carrier. Output inverting means invert the filtered carrier to produce AC line voltage and power at the selected base frequency. Phase modulating means adjust the relative angular phase displacement between the output voltages of the first and second high frequency modules to control the base frequency of the AC line voltage.

The invention also provides an improved, electrical power inverting method, which employs a distinctive, high frequency link, for converting DC power to AC power. The method includes the steps of inverting the DC power to produce an AC voltage at a first output frequency, and to produce an AC voltage at a second output frequency that is substantially the same as the first output frequency. The second AC voltage is out of phase with the first AC voltage by a selected angular displacement, and the two output voltages are mixed to produce a high frequency carrier which has a selected base frequency impressed on the sidebands thereof. This carrier is rectified and filtered, and the filtered carrier is inverted to produce AC line voltage and power at the selected base frequency. The relative angular displacement between the output voltages of the first and second high frequency inverter modules is adjusted to control the base frequency of the AC line voltage.

In a particular aspect of the invention, the phase modulating means includes a line voltage referencing means. An amplitude adjustment means selectively controls the magnitude of the line voltage reference, and a first output comparator means compares the inverter AC line voltage with the line voltage reference signal to produce a resultant line voltage error signal. An inverter module modulating means processes this line voltage error signal to adjust the relative, angular phase displacement between the outputs of the first and second high frequency inverter modules.

A further aspect of the invention is comprised of an energy storage module for selectively storing and releasing a reactive, quadrature component of electrical power that is circulated into an electrical power inverter apparatus from an electrical load. The storage module includes an electrical energy storage means, and includes an output means. The storage module output means flows instantaneous reactive power from the load into the storage means and flows stored electrical power from the storage means into the load. A regulator switching means selectively directs a flow of the reactive power from the load into the storage means and selectively directs a flow of stored reactive power from the storage means into the load. A second line voltage comparator means compares an inverter line voltage to a line voltage reference signal to produce a second line voltage error signal, and a third, a storage comparator means compares a stored energy level in the storage means to a storage referencing means to produce a resultant storage error signal. A switching logic means is responsive to the second and third comparator means, and controls the regulator switching means to direct the flow of reactive power from the load into the storage means in response to a first selected, charge, set of error signals from the second and third comparator means. The logic means means also controls the regulator switching means to direct the flow of reactive power from the storage means into the load in response to a second selected, discharge, set of error signals from the second and third comparator means.

An embodiment of the invention, which employs resonant-type inverter modules, can advantageously operate near resonance throughout the regulation range, and is capable of providing a very high efficiency of up to about 84%–95%. This highly efficient operation reduces heat generation, saves energy, increase reliability of electrical components, and reduces the size and number of required heat sinks.

Since the inverter apparatus of the present invention employs switching at zero crossings, it has simpler power and control circuits; the inverter does not require additional snubber devices to protect and prolong the life of components. In addition, the inverter employs no bulky electromagnetic devices sized for operation at 60 Hz. The inverter can be employed as a dc-to-dc converter, if desired, and can be readily adjusted to generate output power at selected frequencies other than 60 Hz. The inverter of the present invention also provides quick dynamic response because closed-loop control is accomplished on a cycle-to-cycle basis at the frequency of the carrier rather than at the frequency of the output. As a result, the inverter better controls the output voltage waveform when operated with non-linear loads (such as off-line switching power supplies).

The energy storage power module and the power storing technique of the present invention provide several major benefits and advantages. For example, the switches and reactive components of the two, high frequency inverter modules can be sized to accommodate only the real components of power instead of both the real and reactive components of power. Reactive power is circulated at a storage medium of commonly higher voltage (as compared to the primary, dc power supply voltage), and allows the use of higher voltage, lower current transistors. This reduces device on-state losses and reduces cost. Selected transistors can be operated as switching regulators, which, by nature, require lower power rated devices compared to other power conversion techniques. The energy storage means can be an electrolytic capacitor, which has very high energy storage capabilities. In addition, the technique is adaptable to any high frequency link inverter. The device of the present invention is particularly useful for uninterruptible power supply (UPS) battery systems; inverters for solar arrays; battery chargers; dc-to-ac inverters; dc-to-dc converters; and the like.

BRIEF DESCRIPTION OF THE DRAWINGS

The invention will be more fully understood and further advantages will become apparent when reference is made to the following detailed description of the invention a the accompanying drawings in which.

DETAILED DESCRIPTION OF THE INVENTION

Figure 1:
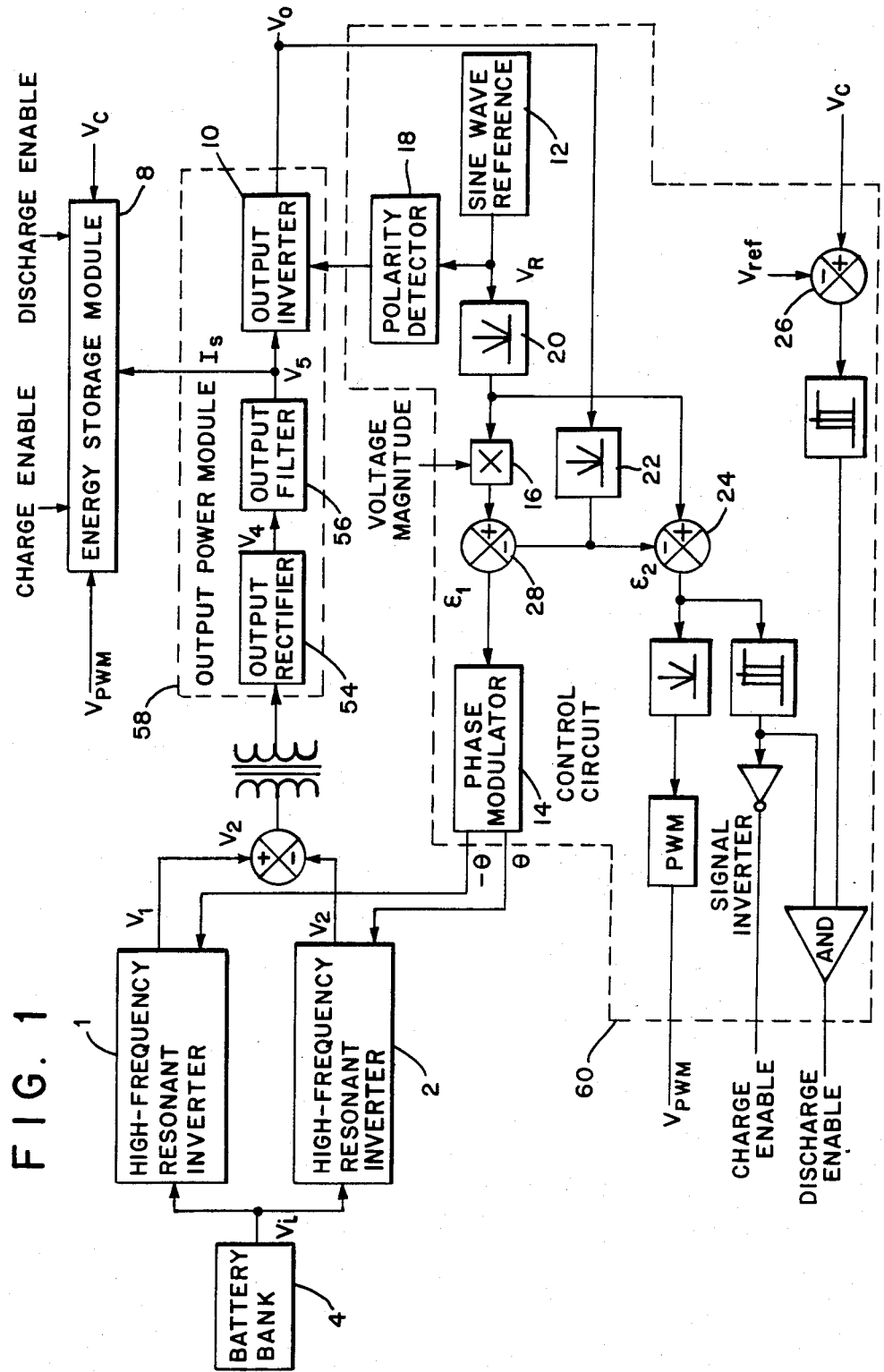
FIG. 1 shows a block diagram of a representative high frequecy inverter of the invention.

The high-frequency link inverter, shown in block form in FIG. 1, involves several power conversion stages. The first stage is comprised of two high-frequency inverter modules operating into resonant loads. The loads are comprised of parallel resonant tank circuits, which naturally shape the semi-conductor load lines to minimize device stress and associated switching losses.

The first high-frequency inverter module 1 inverts DC power delivered from a primary power supply, such as battery bank 4, to produce an AC voltage at a first output frequency and the second high-frequency inverter module inverts the DC power to produce an AC voltage at a second output frequency that is substantially the same as the first output frequency. These first and second output voltages are out of phase by a selected angular displacement.

In subsequent stages, the AC outputs $V_1$ and $V_2$ of the two high-frequency inverter modules, are phased in opposite polarity and mixed in a heterodyning-type process to produce a difference voltage, $V_3$. This difference voltage, which contains the desired output voltage encoded on the sidebands of a high frequency carrier, is rectified by output rectifier means 54, filtered by output filtering means 56, and finally inverted by output inverter 10 at the base frequency of the desired output. The resultant AC line voltage of output power module 58 is substantially sinusoidal at the programmed base frequency. To control and maintain the base frequency of the AC line voltage, the relative angular phase displacement between the first and second output voltages is adjusted by phase modulator 14. Additionally, the phasing of the two voltages can be adjusted to also control the amplitude of the AC line voltage.

Energy storage module 8, the remaining power conversion stage, works in conjunction with output inverter stage 10 to circulate the quadrature (reactive) component of power drawn from the load. An energy storage means, such as a capacitor, selectively stores and releases this cyclical energy.

Figure 3:
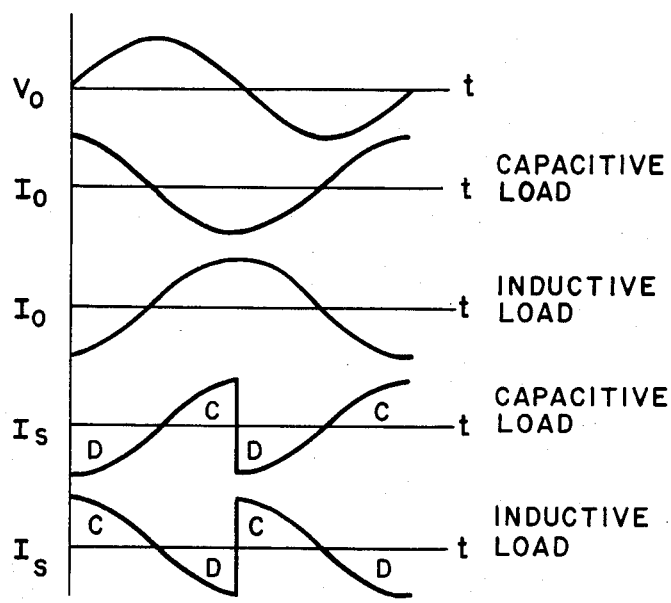
FIG. 3 representatively shows simplified waveforms of cyclic energy transfer within the energy storage module; .

FIG. 3 illustrates the flow of current to and from the energy storage module, and gives examples of both inductive and capacitive inverter loading. When current $I_s$ is positive, the output inverter behaves as a rectifier, and current flows into the energy storage module. Under these conditions, the energy storage capacitor increases slightly in voltage and increases its energy content. When current $I_s$ is negative, the opposite occurs; the capacitor releases the stored energy to the load.

$I_s$ has a triangular carrier at approximately 25 kHz. Simplified waveforms are shown in FIG. 3 for clarity. "C" indicates that the charge switching regulator is enabled and "D" indicates that the discharge switching regulator is enabled.

Energy storage module 8 employs a distinctive bi-directional switching regulator topology; this structure has a high power transfer capability per switch current-voltage rating. The penalty incurred by employing this extra power conversion stage is offset by the fact that the remainder of the inverter does not have to process the quadrature component of power. This allows the inverter to be rated in terms of kilowatts rather than kilovoltamperes.

Referring again to FIG. 1, the inverter concept of the present invention advantageously employs a closed-loop control circuit 60, in which outputs, $\theta$ and $-\theta$, control a phasing of the two resonant inverters 1 and 2. A line voltage reference means, such as reference sine wave 12 (which can be phase-locked to the utility), is compared with the output voltage, $V_o$ by a first comparator means, such as comparator 28. The error signal from comparator 28, $\epsilon_1$, is fed to phase modulator 14, which produces output voltages proportional to its input. The absolute value circuit 20 assures positive polarity, and multiplier 16 provides a means for scaling voltage magnitude. Polarity detector 18 senses the sine wave reference and controls the switching sequence of output inverter 10.

Energy storage module 8 is controlled by comparing the absolute value of a selected line voltage reference means, such as the sine wave reference signal $V_R$, to the output voltage, $V_o$, as modified by absolute value circuit 22. A selected line voltage error signal, such as a negative error signal, $\epsilon_2$, from a second line voltage comparator means, comparator 24, signifies that the output inverter 10 is behaving as a rectifier, and that currents should flow through a "charge" switching regulator to increase voltage across an energy storage capacitor. In this mode, the charge switching regulator is configured to chop at a rate sufficient to maintain a sinusoidal output.

If line voltage error signal $\epsilon_2$ has a selected, positive value, and the voltage $V_C$ across the energy storage capacitor is greater than a selected storage reference means (such as dc reference voltage $V_{ref}$), as determined by a third storage comparator means (such as comparator 26), a "discharge" switching regulator is enabled to release the incremental energy previously stored. When $V_C$ reaches $V_{ref}$, the discharge switching regulator is disabled.

Figure 2:
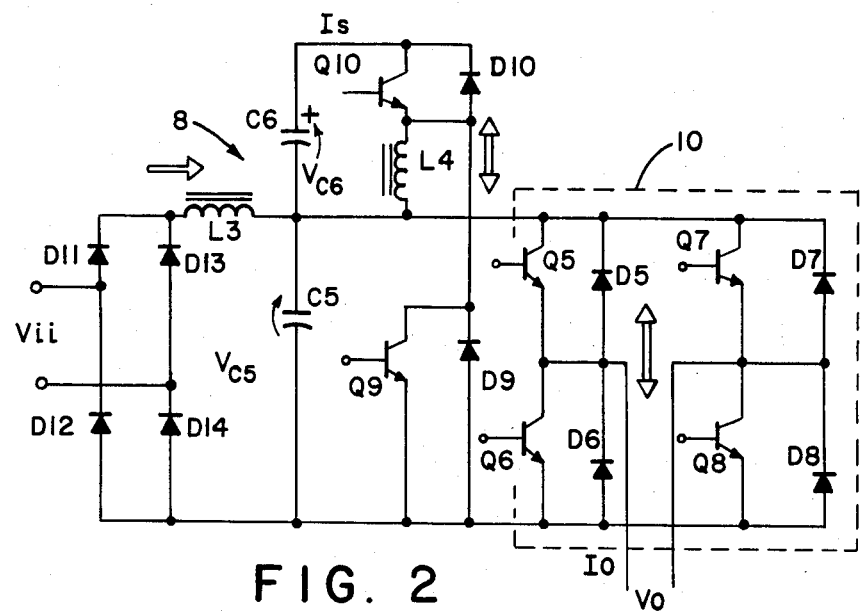
FIG. 2 shows a schematic diagram of a representative energy storage module of the invention.

The distinctive energy storage module of the invention is capable of handling 60 Hz reactive power without complete bi-directional power flow capabilities. Referring to FIG. 2, the output of the energy storage power module contains a full transistor bridge, Q5–Q8, with feedback diodes, D5–D8. When instantaneous, reactive power flows out of the inverter, the transistors conduct; and in the opposing direction, the diodes conduct.

On the return of instantaneous reactive power, capacitor C5 will charge by current flowing through the diode bridge. Transistor Q9, operated as a high frequency switching regulator, causes current to flow out of C5 into L4 during its on-state and into capacitor C6 through diode D10 during its off-state. In the reverse direction, transistor Q10 will cause current to flow out of C6 into L4 during its on-state and into C5 through diode D9 during its off-state. The discharge of C6 causes current to flow into C5 and out through the transistor bridge.

The flow of reactive power causes C6 to charge and discharge at a specific rate and behave as an energy storage means. Voltage and current waveforms that are representative of this technique are illustrated in FIG. 3.

Under normal operating conditions, real power will always flow through the high frequency link into diode bridge, D11–D14. This is because the output power module and load will always have some associated losses.

A basic concept of the phase modulated inverter of the invention is the controlled, angular displacement of the two resonant inverter modules. Their output voltages, $V_1$ and $V_2$, and their difference voltage, $V_3$ can be described by:

$$V_1 = V_m \sin(\omega_c t + \theta) \quad (1)$$

$$V_2 = V_m \sin(\omega_c t - \theta) \quad (2)$$

$$V_3 = V_1 - V_2 = 2V_m \cos(\omega_c t) \sin\theta \quad (3)$$

where $V_m$ is the magnitude of the resonant inverter outputs, $\omega_c$ is the carrier frequency, and $\theta$ is the phase displacement.

Sidebands are introduced by varying $\theta$, the desired form of which is given by:

$$\theta = \sin^{-1}[m|\sin(\omega_o t)|]; \quad (4)$$

where constant m is the modulation index and $\omega_o$ is the desired base output frequency.

$V_3$, the voltage applied to the high-frequency transformer, can be expressed in terms of a Fourier series. Since $$|\sin(\omega_o t)| = \frac{2}{\pi} - \frac{4}{\pi} \sum_{k=2,4,\ldots}^{\infty} \frac{\cos(k\omega_o t)}{(k+1)(k-1)}, \quad (5)$$

substituting (4) and (5) into (3) gives $$V_3 = 2V_m \cos(\omega_c t) m |\sin(\omega_o t)| \quad (6)$$

$$= \frac{4}{\pi} mV_m \cos(\omega_c t) - \frac{4}{\pi} mV_m \sum_{k=2,4,\ldots}^{\infty} \frac{1}{(k+1)(k-1)} \cdot$$

-continued
$$[\cos((\omega_c + k\omega_o)t) + \cos((\omega_c - k\omega_o)t)].$$

The second stage involves rectifying $V_3$. To perform this mathematically, $V_3$ is multiplied by a unit square wave, $H_s$. This is given by $$H_s = \frac{4}{\pi} \sum_{n=1,3,\ldots}^{\infty} \frac{\sin\left(\frac{n\pi}{2}\right)}{n} \cos(n\omega_c t) \quad (7)$$

$$V_4 = V_3 \cdot H_s \quad (8)$$

$$= \frac{8}{\pi} V_m \cos(\omega_c t) \sin\theta \sum_{n=1,3,\ldots}^{\infty} \frac{\sin\left(\frac{n\pi}{2}\right)}{n} \cos(n\omega_c t)$$

$$= \frac{4}{\pi} mV_m |\sin(\omega_o t)| +$$

$$\frac{8}{\pi^2} mV_m \sum_{n=1}^{\infty} (-1)^n \left[\frac{1}{2n+1} - \frac{1}{2n-1}\right] \cos(2n\omega_c t) -$$

$$\frac{8}{\pi^2} mV_m \sum_{k=2,4,\ldots}^{\infty} \sum_{n=1}^{\infty} (-1)^n \frac{1}{(k+1)(k-1)} \left[\frac{1}{2n+1} - \right.$$

$$\left. \frac{1}{2n-1}\right] \cdot [\cos((2n\omega_c + k\omega_o)t) + \cos((2n\omega_c - k\omega_o)t)].$$

Figure 4:
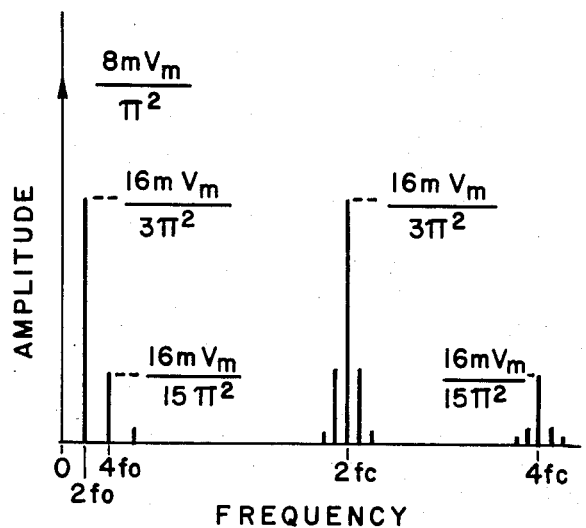
FIG. 4 representatively shows the frequency spectrum of $V_4$ within the inverter device of FIG. 1.

FIG. 4 illustrates the spectrum characterized in (8). The terms containing $\omega_c$ are consecutively filtered leaving $$V_5 = \frac{4}{\pi} mV_m |\sin(\omega_o t)| \quad (9)$$

$$V_o = \frac{4}{\pi} mV_m \sin(\omega_o t) \quad (10)$$

at the input and output of the output inverter.

Figure 5:
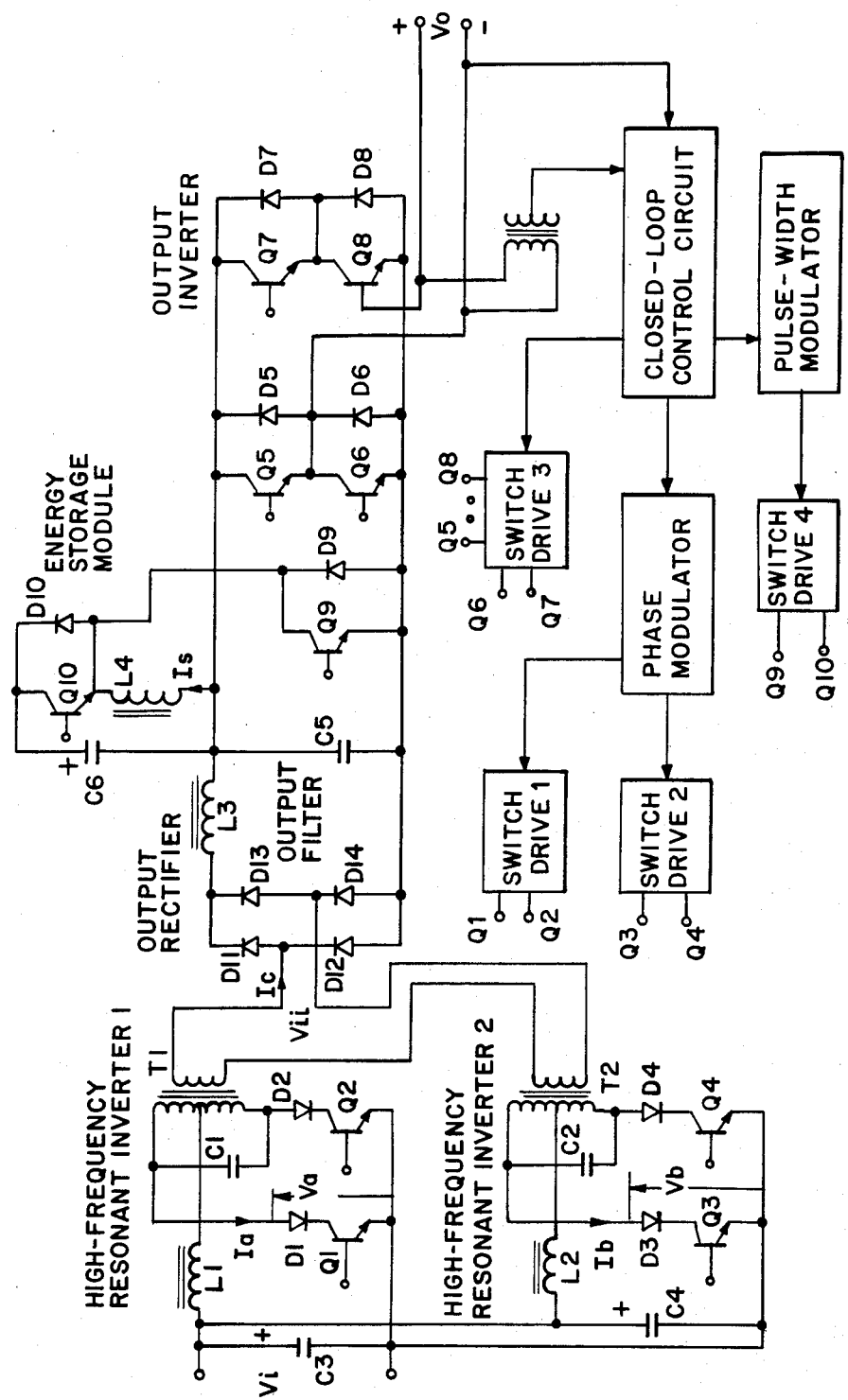
FIG. 5 representatively shows a schematic of a power circuit and a block diagram of a control circuit for the inverter device of FIG. 1.

FIG. 5 shows a schematic of a power circuit and a block diagram of a control circuit, which were constructed in accordance with the invention.

High-frequency, resonant inverter 1 had the structure of a current-fed, parallel resonant inverter. Inductor L1 increased the source impedance and capacitor C1 and transformer T1 formed the resonant network. The resonant network was excited at its natural frequency through the switching of Q1 and Q2. Diodes D1 and D2 protected the transistors from reverse voltage.

The second resonant inverter was identical to the first. The two inverters were connected in parallel at the input, and in series at the output.

The series connected outputs of transformers T1 and T2 connected to a high-frequency diode bridge comprised of D11–D14.

The output of the diode bridge fed into a low pass filter comprised of inductor L3 and capacitor C5, which subsequently connected to an output inverter, comprised of transistors Q5–Q8 and diodes D5–D8. Diodes D5–D8 formed a diode bridge allowing the output inverter to behave as a rectifier with non-resistive loads.

The energy storage module, which is essentially a bi-directional switching regulator, was comprised of transistors Q9 and Q10, diodes D9 and D10, inductor L4, and energy storage capacitor C6. To charge the energy storage capacitor, transistor Q9 was switched off and on at a rate determined by error signal $\epsilon_2$. With transistor Q9 switched on, current builds through inductor L4. With it switched off, diode D10 conducted relinquishing the energy stored in L4 to capacitor C6. To remove energy from capacitor C6, transistor Q10 and diode D9 became the active elements, and the circuit behaved in the identical but opposite manner.

The magnetic components T1 and T2 were, for example, fabricated with 1.00 square inch, ferrite, C-cores wound with litz wire. The use of litz wire decreased ac resistance and minimized losses due to stray flux.

Upon evaluation of the resonant inverters, the closed-loop feedback was slightly modified to produce a constant phase displacement at desired set points. Different operating conditions were then studied with the understanding that set points would be varied at a 120 Hz rate during actual operation.

Figure 6:
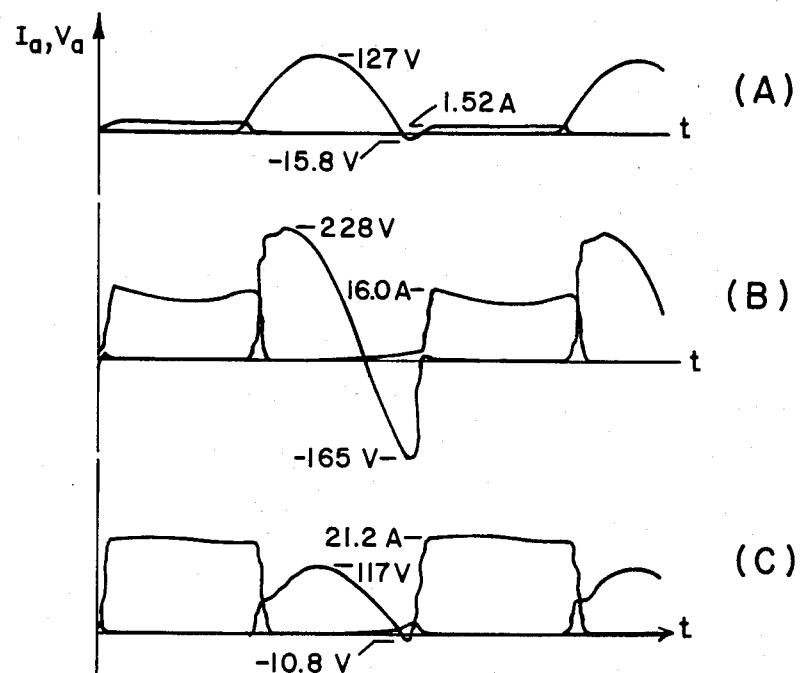
FIGS. 6(A), (B) and (C) show representative waveforms for current $I_a$ and voltage $V_a$ of FIG. 5 at three different set points.
Figure 7:
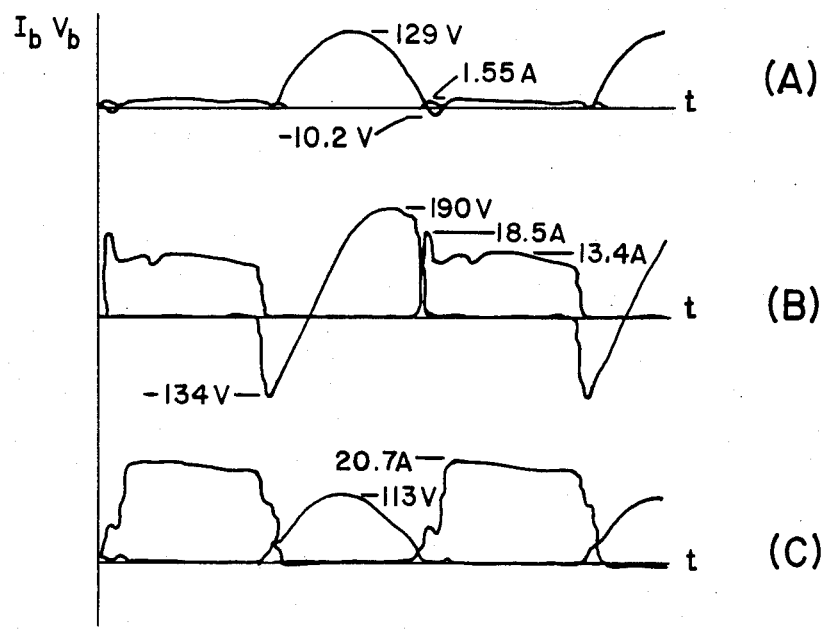
FIGS. 7(A), (B) and (C) representative waveforms for current $I_b$ and voltage $V_b$ of FIG. 5 at three different set points.

FIGS. 6 and 7 representatively show typical transistor and series connected diode waveforms at three different set points. As can be observed, resonant inverter 1 operated with a lagging power factor and resonant inverter 2 operated with a leading power factor. Non-unity power factor occurred because the two inverters were operated out of phase. During positive portions of the voltage waveform, the transistors blocked voltage and during negative portions, the series diodes blocked voltage.

Figure 8:
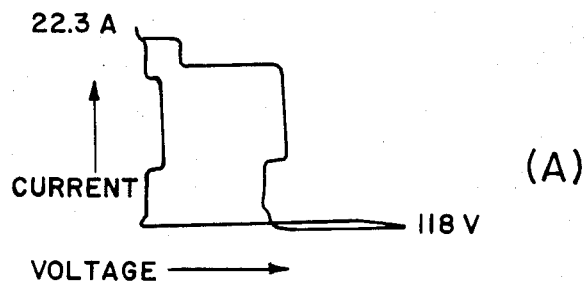
FIG. 8 shows representative transistor load lines of the resonant inverter modules.
Figure 8:
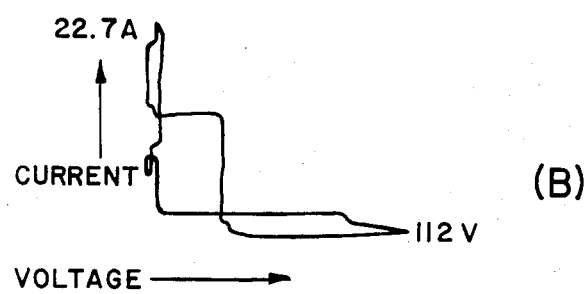

Voltage stress across the switching semiconductors was maximum at a phase displacement of 45° and minimum at 0° and 90°. FIG. 8 representatively shows typical transistor load lines of both resonant inverter modules at maximum phase displacement. Inductive load lines common to switching power supplies are generally box-type and the ones shown here are a major improvement. The waveforms shown were digitized on a storage scope and the limited bandwidth caused some rise and fall time exaggeration. Nearly perfect L-shape load lines have been achieved experimentally.

Figure 9:
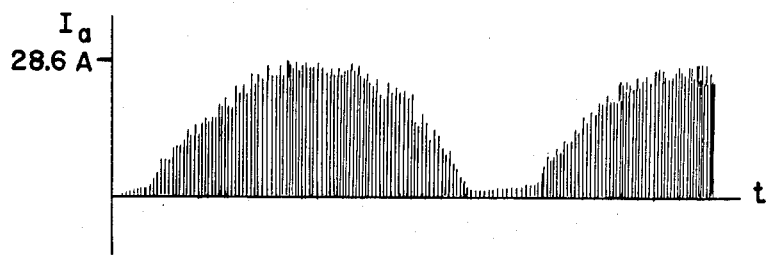
FIG. 9 shows a representative waveform of transistor current $I_a$ of FIG. 5 during operation of the inverter device.
Figure 10:
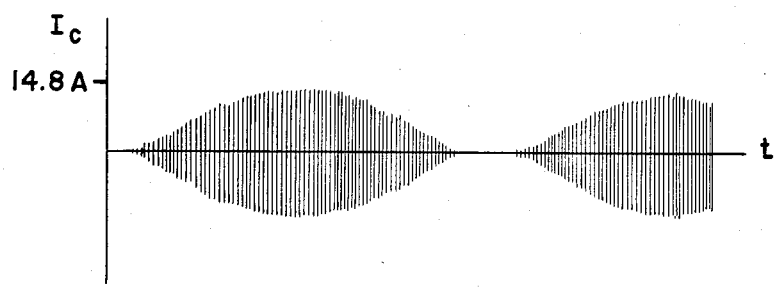
FIG. 10 shows a representative waveform of current $I_c$ of FIG. 5 during operation of the inverter device.

With the above described modifications to the control circuit removed, phase displacements and inverter currents and voltages varied at a 120 Hz rate. Representative waveforms for the transistor current and the input to the diode bridge are shown in FIGS. 9 and 10, respectively.

Figure 11:
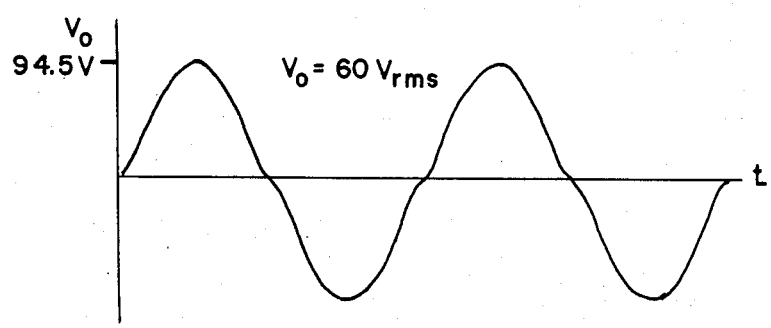
FIG. 11 shows a representative waveform of the output voltage, $V_o$, of FIG. 5 during operation of the inverter device.

FIG. 11 representatively shows the inverter output with resistive loading. Distortion, located at the zero crossing of output voltage, was caused by limited gain, as required to stabilize the system, and by control error. Control error occurred because the phase displacements respond proportionally to the error signal rather than to the inverse sine. The effect of this condition, stated in equation (4), diminishes as the gain is increased. The distortion can be reduced without increasing gain by adding an inverse sine operator within the control loop.

Figure 12:
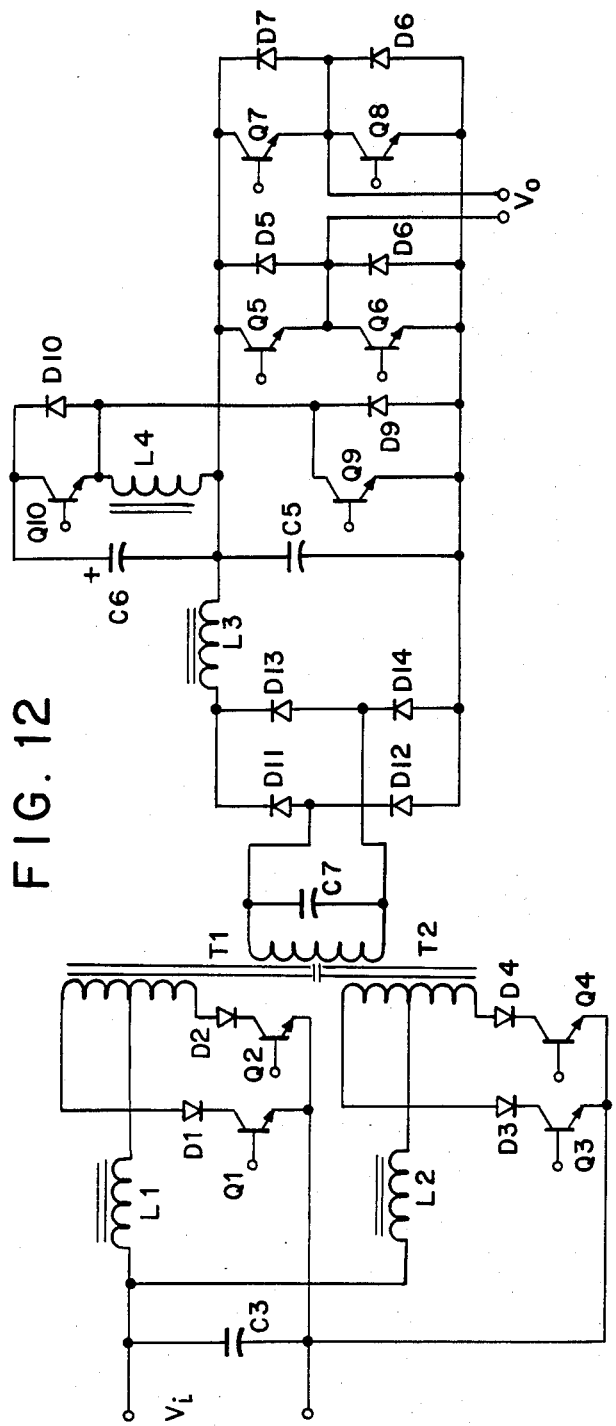
FIG. 12 representatively shows a schematic of an alternate power circuit for the inverter device.

FIG. 12 shows another embodiment of the power circuit. The structure is similar to that previously described, except the number of tank circuits has been reduced from two to one, and resonant capacitor C7 is placed across the secondary winding of transformer T1-T2.

In this embodiment of the invention, only the difference voltage, $V_3$, in equation (3), is tuned rather than its components, $V_1$ and $V_2$. Tuning the separate components produces high circulating currents even with zero power output. The scheme shown substantially eliminates these circulating currents and allows use of a single capacitor having higher voltage requirements but lower current requirements. The capacitors needed for this application tend to be limited by allowable rms currents. In addition, this embodiment substantially eliminates interactions between the two resonant inverters, which can cause excessively high voltages. As a result, there is reduced voltage stress across the switching semiconductors.

Figure 13:
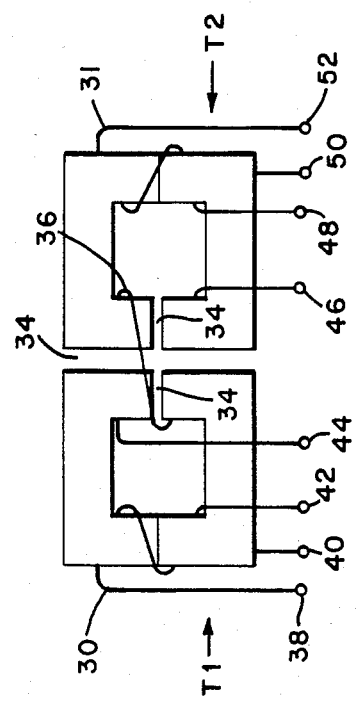
FIG. 13 schematically shows the construction of transformers T1 and T2 of FIG. 12.

The magnetic design for transformer T1-T2, shown in FIG. 13, uses both foil and litz wire construction. The foil conductors employed to construct primary windings 30 and 31 should be bifilar wound to minimize leakage inductance. This limits voltage spiking across the switching semiconductors. The air gaps 34, placed in the center of the secondary winding 36, confined stray flux without producing excessive losses. Leads 38, 40 and 42 from primary winding 30 connected to high-frequency inverter module 1, and leads 48, 50 and 52 from primary winding 31 connected to high-frequency inverter module 2. Secondary winding 36 was constructed from litz wire and connected to the output power module through leads 44 and 46.

On-state losses of the resonant inverter transistors can be improved by approximately 25% by allowing collector-to-emitter saturation. To accomplish this, a proportional drive scheme can be substituted for the Darlington drive. This will reduce on-state losses and heat sinking requirements, and will also reduce control circuit losses.

A proportional drive scheme can also be employed for the output inverter. This can be accomplished with a single low-frequency transformer having limited VA (volt-ampere) capacity, and would reduce the complexity of the previous circuitry.

In addition, the inverter device of the invention can include further circuitry as required to satisfy particular performance specifications. These circuits can include, for example, a dc to dc converter for biasing, solid-state transfer switches, self-protection circuits, an alarm circuit, and phase synchronization circuits.

EXAMPLE

A second utility interactive, photovoltaic inverter was built to further demonstrate the power conversion technique of the present invention. Two resonant, high-frequency inverters were modulated to produce a dc isolated carrier containing the desired output frequency on its sidebands. This signal, when rectified, filtered and inverted, produced 60 Hz sinusoidal voltages and currents, which were compatible with the utility.

Figure 14:
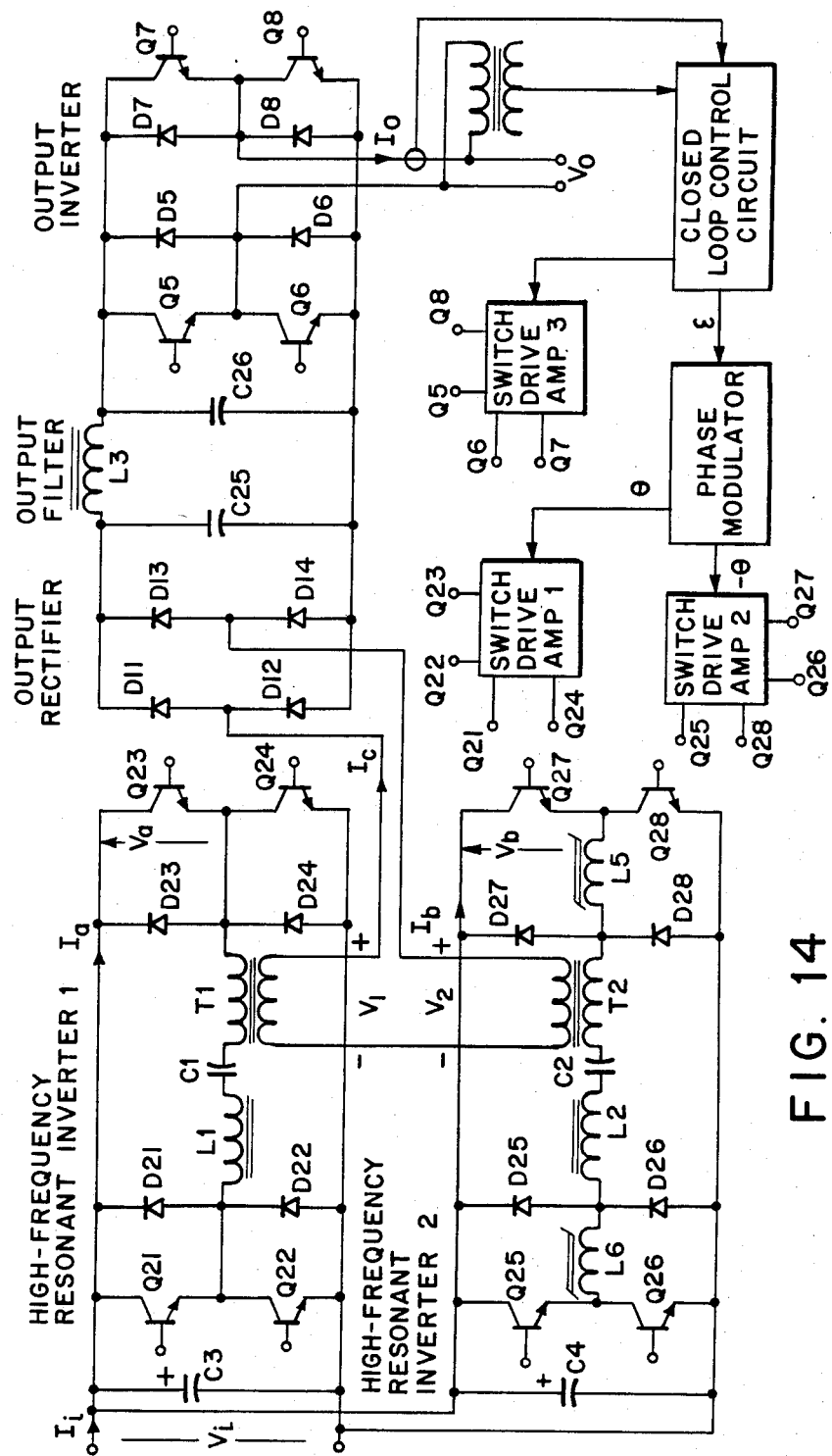
FIG. 14 representatively shows a schematic of a power circuit employed by the inverter device described in EXAMPLE 1.

FIG. 14 shows the power circuit of the hardware. High-frequency, resonant inverter 1 was structured in a full-bridge configuration, comprised of transistors $Q_{21}$–$Q_{24}$ and diodes $D_{21}$–$D_{24}$, and fed the resonant load comprised of inductor $L_1$, capacitor $C_1$ and transformer $T_1$. The second high-frequency inverter 2 was identical to inverter 1, except for saturable reactors $L_5$ and $L_6$. The purpose of these reactors is explained below. The secondary windings of $T_1$ and $T_2$ connected to output rectifier $D_{11}$–$D_{14}$. Capacitor $C_{25}$ and inductor $L_3$ formed a parallel resonant network to suppress transients and cause commutation at zero voltage. Capacitor $C_{26}$ and inductor $L_3$ formed a low pass filter to suppress unwanted high-frequency harmonics. The output inverter connected to the utiltity and was also structured in a full-bridge configuration.

The magnetic components were fabricated with 1.00 square inch, ferrite, C-cores wound with litz wire. The litz wire decreased ac resistance and minimized losses due to stray flux.

The lagging and leading inverter loading undesireably caused semiconductor switching at non-zero currents. This condition was maximum at a phase displacement of 45° and minimum at 0° and 90°. The problem was completely resolved in resonant inverter 2 by employing saturable reactors, $L_5$ and $L_6$. These reactors, constructed with 10 turns of #16 wire on 0.0938 square inch toroidal ferrite cores, lowered the di/dt of the conducting transistors and provided several microseconds of delay to allow recovery of the anti-parallel diodes, $D_{25}$-$D_{28}$. Energy stored in the reactors was released to the source during conduction of the anti-parallel diodes, and the transistors $Q_{25}$-$Q_{28}$ were switched at substantially zero current.

For resonant inverter 1, no form of snubber was used and some switching losses did occur. However, unlike conventional switchmode power supplies, device stress and losses were maximum at approximately half power and decreased beyond that point. As will be addressed, these losses resulted in a 0.5% loss in inverter efficiency.

If the inverter was not required to operate at zero output current, a dual configuration of the saturable reactors (this is, capacitors placed across the transistors) could have been employed. The restriction in applying this technique is that the capacitors require precharging, a condition not satisfied with zero lagging current.

Figure 15:
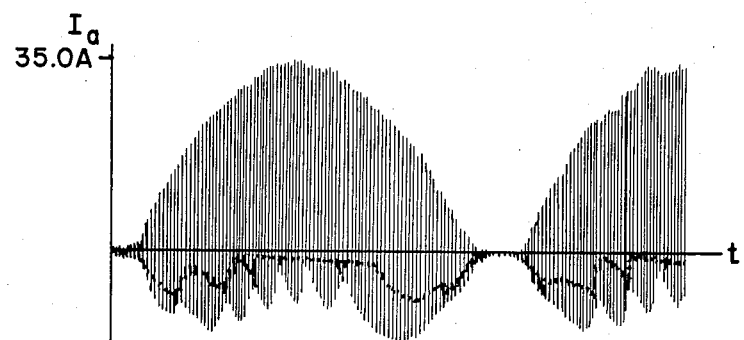
FIG. 15 shows a representative waveform for transistor Q23 FIG. 14.
Figure 16:
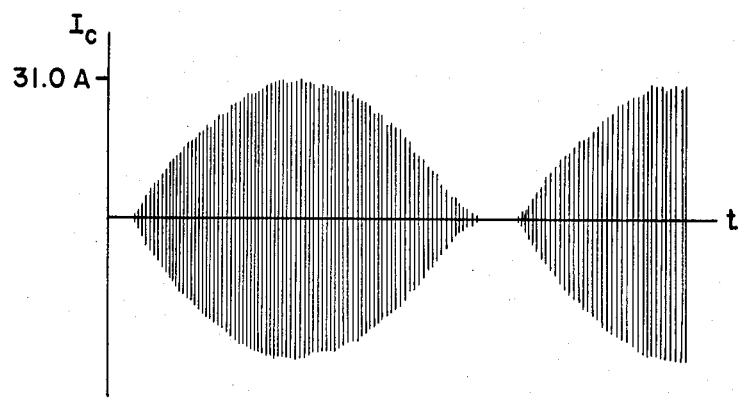
FIG. 16 shows a representative waveform for the input current of the output rectifier of FIG. 14.

During operation, phase displacements and inverter currents varied at a 120 Hz rate. Representative waveforms for transistor Q23 and for the input to the output rectifier bridge are representatively shown in FIGS. 15 and 16, respectively.

Figure 17:
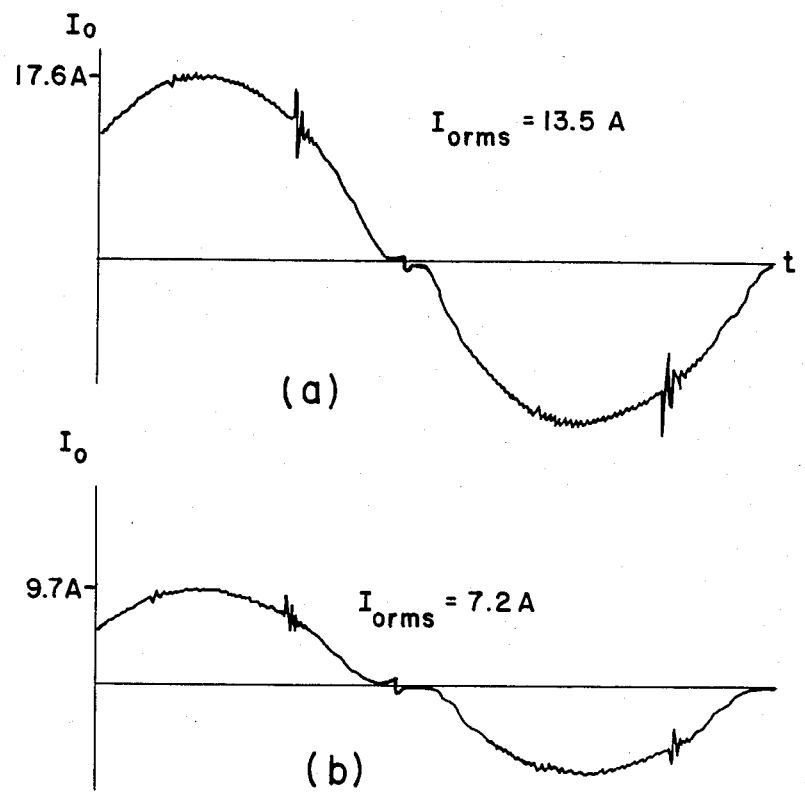
FIGS. 17(A) and (B) representatively show output current $I_o$ of FIG. 14 under a utility load of 240 volts.
Figure 18:
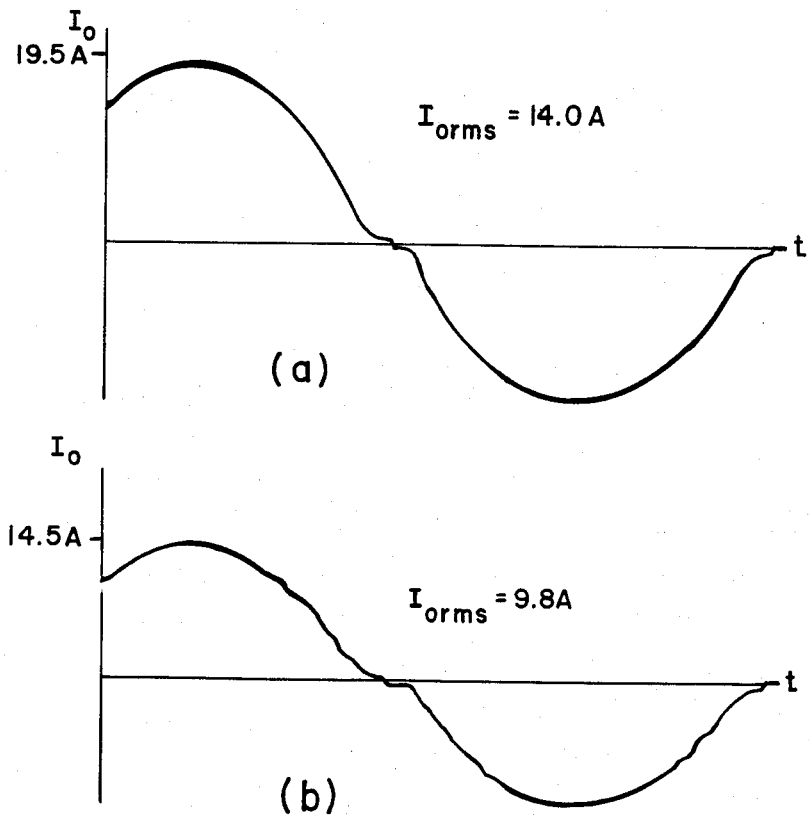
FIGS. 18(A) and (B) representatively show output current $I_o$ of FIG. 14 under a resistive, 3.3 kW load.

FIGS. 17 and 18 representatively show inverter output current under utility loading and resistive loading, respectively. In FIG. 17, the distortion, located at the zero crossing of output current, resulted from limited gain, as required to stabilize the system, and control error. The control error occurred because the phase displacement responds proportionally to the error signal rather than to the inverse sine. This control error diminished as gain was increased. The glitches shown in FIG. 17 can be explained by the same reasoning.

Figure 19:
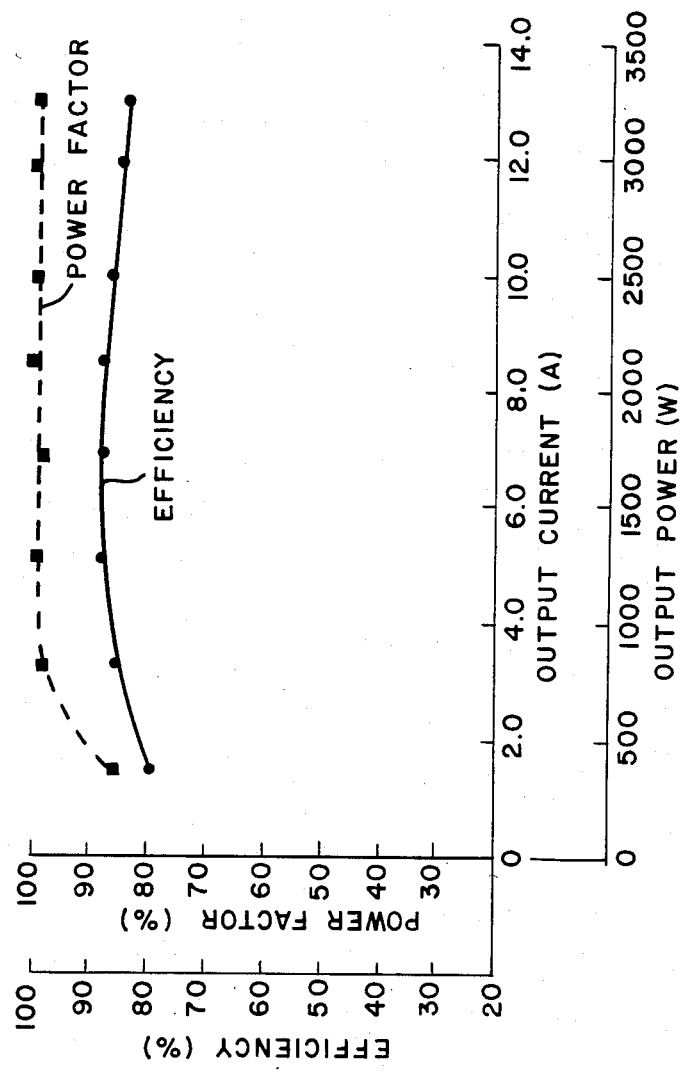
FIG. 19 representatively shows efficiency and power factor as a function of inverter device output current and device output power.

Curves of power factor and efficiency are representatively shown in FIG. 19. Power factor was near unity throughout most of the control, and an efficiency of 84% was attained at maximum power output. The predominant loss mechanisms were in the magnetics, the control circuit, and the on-state condition of the transistors in the resonant inverters.

A breakdown of losses at 3 kW output is given in Table I. Dominant losses occurred in the magnetics, control circuit, and on-state conditions of the resonant inverter transistors. On-state losses for the particular topology were reasonable, but losses for the magnetics and control circuit were high.

These magnetics and control circuit losses, however, can readily be reduced by reducing the flux density in the cores, increasing the wire cross-sectional area in the windings, and by applying proportional drives in the control circuit.

TABLE I

| System Looses Under Maxium Power Conditions | | |
|---|---|---|
| Component(s) | Loss Mechanism | Loss (Watts) |
| $Q_{21}$-$Q_{28}$, $D_{21}$-$D_{28}$ | Conduction | 96.5 |
|  | Switching | 26.1 |
| $D_{11}$-$D_{14}$ | Conduction | 24.9 |
| $Q_5$-$Q_8$, $D_5$-$D_8$ | Conduction | 29.1 |
| $T_1$, $T_2$ | Core | 88.6 |
|  | Winding | 38.4 |
| $L_1$, $L_2$ | Core | 88.6 |
|  | Winding | 26.6 |
| $L_3$ | Core | 14.7 |
|  | Winding | 4.4 |
| Control Circuit |  | 103.8 |
|  | Total | 541.7 |

Having thus described the invention in rather full detail, it will be understood that these details need not be strictly adhered to, but that various changes and modifications may suggest themselves to one skilled in the art, all falling within the scope of the present invention as defined by the subjoined claims.

I claim:

1. An electrical power inverter apparatus, which includes a high frequency link, for converting DC power to AC power, comprising:
   (a) a first high frequency inverter module which produces a first AC voltage at a first output frequency;
   (b) a second high frequency inverter module which produces a second AC voltage at a second output frequency, which is substantially the same as said first output frequency and is out of phase with said first output voltage by a selected angular phase displacement;
   (c) mixing means for mixing said first and second output voltages to produce a high frequency carrier which has a selected base frequency impressed on the sidebands thereof;
   (d) rectifying means for rectifying said carrier;
   (e) filtering means for filtering the rectified carrier;
   (f) output inverting means for inverting the filtered carrier to produce an AC line voltage at said selected base frequency; and
   (g) phase modulating means for adjusting the relative angular phase displacement between the outputs of said first and second high frequency inverter modules to control the base frequency of said AC line voltage.

2. An apparatus as recited in claim 1, wherein said phase modulator means also controls the magnitude of said AC line voltage.

3. An apparatus as recited in claim 1, wherein said phase modulator means comprises:
   (a) a line voltage referencing means for producing a line voltage reference signal;
   (b) amplitude adjustment means for selectively controlling the magnitude of said line voltage reference signal;
   (c) output comparator means for comparing said inverter AC line voltage with said line voltage reference signal to produce a first line voltage error signal; and
   (d) inverter module modulating means for processing said line voltage error signal to adjust the relative, angular phase displacement between the outputs of said first and second high frequency inverter modules.

4. An apparatus as recited in claim 3, wherein said phase modulator means also controls the magnitude of said AC line voltage.

5. An apparatus as recited in claim 2, wherein said phase modulator means further comprises inverse sine operator means for reducing voltage distortion in said AC line voltage.

6. An apparatus as recited in claim 1, wherein said first and second inverter modules are configured as resonant-type inverter modules.

7. An apparatus as recited in claim 1, further comprising proportional drive means for driving power switches in said output inverter means.

8. An apparatus as recited in claim 1, further comprising an energy storage module for selectively storing and releasing a reactive, quadrature component of power that is circulated into said inverter apparatus from an electrical load, said storage module comprising:
   (a) electrical energy storage means for storing electrical energy;
   (b) storage module output means for flowing instantaneous reactive power from said load into said storage means and for flowing stored electrical power from said storage means into said load;
   (c) regulator switching means for selectively directing a flow of said reactive power from said load into said storage means and for selectively directing a flow of stored reactive power from said storage means into said load;
   (d) second comparator means for comparing said inverter line voltage with a line voltage reference signal to produce a second line voltage error signal;
   (e) third comparator means for comparing a storage energy level in said storage means with a storage referencing means to produce a resultant, storage error signal;
   (f) switching logic means responsive to said second and third comparator means for controlling said regulator switching means to direct said flow of reactive power from said load into said storage means in response to a first selected charge, set of error signals from said second and third compartor means and to direct said flow of reactive power from said storage means into said load in response to a second selected, discharge, set of error signals from said second and third comparator means.

9. An apparatus as recited in claim 6, wherein said storage module output means is comprised of said output inverter means.

10. A method for converting electrical DC power to AC power, comprising the steps of:
    (a) inverting said DC power to produce a first AC voltage at a first output frequency;
    (b) inverting said DC power to produce a second AC voltage at a second output frequency that is substantially the same as the first output frequency, said second output voltage being out of phase with said first AC voltage by a selected angular displacement;
    (c) mixing said first and second output voltages to produce a high frequency carrier which has a selected base frequency impressed on the sidebands thereof;
    (d) rectifying said carrier;
    (e) filtering said rectified carrier;
    (f) inverting said filtered carrier to produce an AC line voltage at said base frequency; and
    (g) adjusting the relative angular phase displacement between said first and second output voltages to control the base frequency of said AC line voltage.

11. A method as recited in claim 10, further comprising the step of adjusting the phasing of said first and second output frequencies to control the amplitude of said AC line power.

12. A method as recited in claim 10, wherein said adjusting step (g) comprises the steps of:
    (a) producing a line voltage reference signal;
    (b) selectively controlling the magnitude of said line voltage reference signal;
    (c) comparing said inverter AC line voltage with said line voltage reference signal to produce a first line voltage error signal; and
    (d) processing said line voltage error signal to adjust the relative, angular phase displacement between the outputs of said first and second AC voltages.

13. A method as recited in claim 10, further comprising the steps of:
    (a) storing a reactive, quadrature component of power circulated from a load means;
    (b) comparing said AC line voltage with a line voltage reference signal to produce a second line voltage error signal;
    (c) comparing a stored energy level value in said storage module with a storage reference signal to produce a resultant storage level error signal;
    (d) selectively directing said reactive, quadrature component of power from said storage means into said load in response to a first selected, discharge set of storage error signal and second line voltage error signal values; and
    (e) selectively directing reactive power from said load into said storage means in response to a second selected, charge set of storage error signal and second line voltage error signal values.

* * * * *